United States Patent [19]

Kraemer

[11] Patent Number: 4,821,636
[45] Date of Patent: Apr. 18, 1989

[54] APPARATUS FOR LIFTING A BUNDLE OF CONDUCTORS OFF A SURFACE

[75] Inventor: Siegfried Kraemer, Hamburg, Fed. Rep. of Germany

[73] Assignee: Messerschmitt-Boelkow-Blohm GmbH, Munich, Fed. Rep. of Germany

[21] Appl. No.: 99,313

[22] Filed: Sep. 21, 1987

[30] Foreign Application Priority Data

Sep. 23, 1986 [DE] Fed. Rep. of Germany ....... 3632239

[51] Int. Cl.$^4$ .................... H01R 43/00; B65B 13/06
[52] U.S. Cl. ................................ 100/19 R; 29/745; 29/755; 100/8; 140/93 A
[58] Field of Search ............... 29/745, 755, 760, 868, 29/872, 873; 140/93 A; 100/1, 2, 3, 8, 19 R

[56] References Cited

U.S. PATENT DOCUMENTS 3,391,440  7/1968  Harms .................... 29/755 X
4,343,237  8/1982  Endruhn .
4,677,734  7/1987  Bloch et al. ............ 29/564.6 X

FOREIGN PATENT DOCUMENTS 1540009  8/1969  Fed. Rep. of Germany .

Primary Examiner—Carl E. Hall
Attorney, Agent, or Firm—W. G. Fasse; D. H. Kane, Jr.

[57] ABSTRACT

A cable bundle is lifted off the nail board for presentation to a binding or lashing tool. The lifting is accomplished by a claw which has two claw members, one is spring biased and initially slightly lifts the bundle off the nail board. The other claw member is driven by a motor to first come into engagement with the other claw and then to further lift the bundle. The lifting and presenting claw mechanism and a binding and lashing mechanism are both carried by a robot arm closely spaced to each other for cooperation. Both devices can be operated in response to a computer program control. Due to the lifting and presenting of the bundle, the binding can be performed automatically without the need for any spacers between the nail board and the conductor bundle.

7 Claims, 3 Drawing Sheets

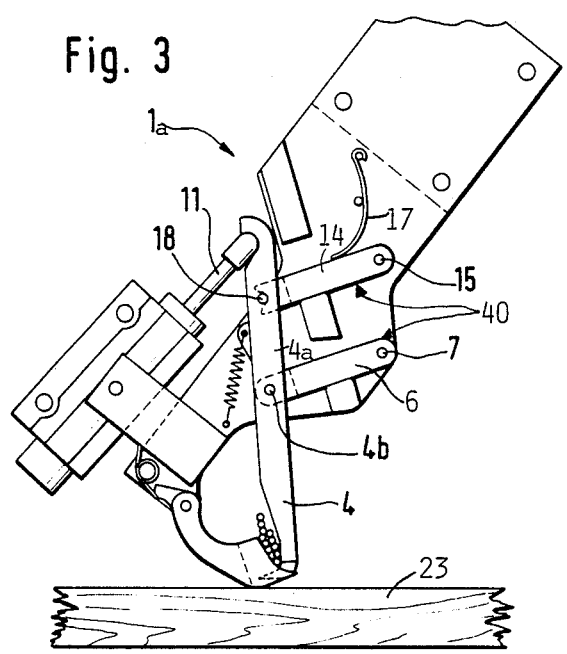
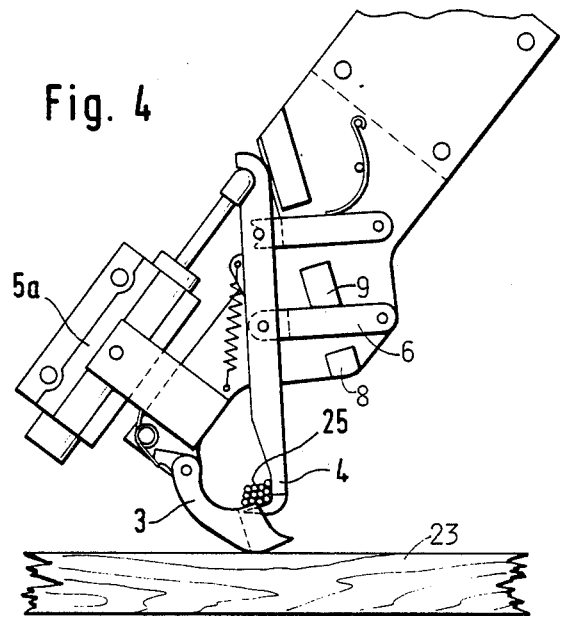

APPARATUS FOR LIFTING A BUNDLE OF CONDUCTORS OFF A SURFACE

FIELD OF THE INVENTION

The invention relates to an apparatus for lifting a bundle of conductors off a surface and for presenting the lifted bundle to a motor driven binding or lashing device which applies cable binders to the lifted bundle to form the cables. First, the individual conductors are assembled on a nail board forming a conductor assembly harness, to form the cable bundles. The motor driven binding or lashing device is supported by a robot arm for cooperation with the present apparatus.

DESCRIPTION OF THE PRIOR ART

German Patent Publication (DE-PS) No. 2,939,360 corresponding to U.S. Pat. No. 4,343,237 (Endruhn) describes an apparatus for the automatic production of cable bundles or cable trees. The known apparatus employs a so-called cable table provided with a plurality of pins forming an assembly harness also referred to as a nail board. The individual conductors of a bundle are guided by means of a cable laying carriage which is movable in the x- and y-directions in response to a program controlled drive. The carriage is equipped with a cable head which guides the individual conductors around the nails or pins. The following operations are performed automatically. Determined types of cables are picked up in a magazine. A marking tool, such as a printer, marks each individual conductor. The head guides and lays the individual conductors around the pins.

The assembly of such a cable bundle does not yet result in a finished cable tree. An important step involves the subsequent binding or lashing of the bundles with so-called cable binders or lashes for forming the tree. This binding or lashing or operation is performed by hand, however, with the aid of a motor driven binding tool which carries a supply of cable binders or lashes. The motor driven tool must be moved manually to each location where a cable binder or lashing is to be applied. The tool is equipped with claws which encircle the bundle of conductors for applying the cable binder or lashing. In order to enable the claws to grip the bundles it is necessary that the nail board is equipped with spacers to provide a free through-passage or space between the surface of the board and the conductors so that the respective claw can pass into the space between the board and the conductors.

A distinct disadvantage of the above described procedure is seen in that the very efficient laying of the individual conductors provides economic advantages which are nullified again by the manual application of the cable binders or lashings.

In the German Periodical (DE-Z) "VDI-Nachrichten", (News) No. 32 of Aug. 9, 1985, page 15, there is disclosed a horizontally tiltable robot tool suspended from a robot arm for producing of cable trees. The tools employed in this robot use tongs operated by pressurized air for bundling or binding the previously laid conductors. This kind of tool also requires spacers between the nail board and the conductors so that the tongs of the binding apparatus or tool may have the required free space for their operation.

Thus, both prior art methods require spacers on the nail board to enable the subsequent binding operation. These spacers are either used alone, or they are used in combination with the above pins or nails. The use of spacers in combination or instead of the pins makes the production of the so-called nail boards more expensive. Additionally, conventional nail boards without such spacers which are suitable for a manual binding operation, are not suitable for the above purposes and the expense for equipping such nail boards with the required spacers is substantial. However, without such spacers the conventional nail boards are not suitable for the automated binding operations.

OBJECTS OF THE INVENTION

In view of the above it is the aim of the invention to achieve the following objects singly or in combination:

to construct a cable bundle presenting tool in such a way that that can pick up a cable bundle and present it to a binding apparatus without the above mentioned spacers;

to present the previously laid cable bundles to the binding operation without damaging the individual conductors nor their markings; and to simplify the formation of so-called cable trees.

SUMMARY OF THE INVENTION

The cable bundle take-up and presenting apparatus according to the invention is characterized in that it is attached to a robot arm which also carries a binding or lashing device in such a way that the bundle presenting apparatus and the lashing device are closely spaced from each other for cooperation when the robot arm brings the tool into an operating position.

More specifically, the bundle presenting apparatus according to the invention comprises a spring loaded claw which reaches under the bundle of conductors when the robot arm lowers the bundle presenting apparatus. A further motor driven claw of the bundle presenting apparatus is so movable relative to the first mentioned spring loaded claw that it first closes a gripper and then continues its motion for lifting the conductors forming a bundle.

The advantages achieved by the invention are seen in that the manufacturing effort and expense for making the cable trees has been lowered and the individual cable binders or lashings can now be applied more rapidly and more precisely. Another advantage resides in the fact that conventional nail boards without any spacers can be used in combination with the present apparatus.

BRIEF DESCRIPTION OF THE DRAWINGS

In order that the invention may be clearly understood, it will now be described, by way of example, with reference to the accompanying drawings, wherein:

FIG. 3 shows the apparatus of FIG. 1 with the jaws fully closed;

FIG. 4 shows the apparatus of FIG. 1 with the claws presenting the bundle in a binding position;

DETAILED DESCRIPTION OF PREFERRED EXAMPLE EMBODIMENTS AND OF THE BEST MODE OF THE INVENTION

Figure 1:
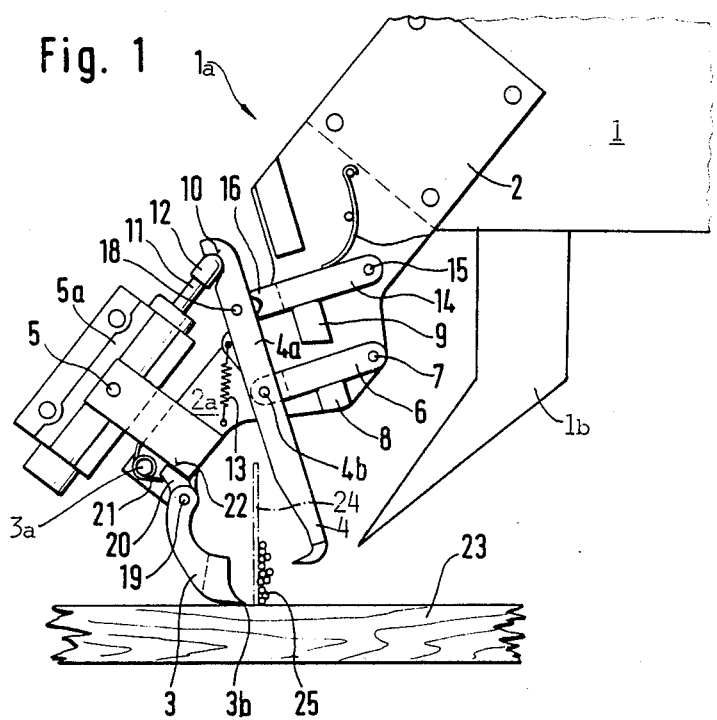
FIG. 1 is a side view of the present bundle presenting apparatus in a position just ready for lifting a conductor bundle into a binding position.

FIG. 1 shows a robot arm 1 carrying a bundle or cable presenting apparatus 1a and a bundle binder tool 1b. The robot with its arm 1 and the bundle binder tool 1b are not part of the invention and hence not described in detail. The binder tool may be of the type described above as part of the prior art. The bundle presenting apparatus 1a of the invention comprises a carrier plate 2 secured to the robot arm by conventional means. Two claws are provided to form a bundle lifting and presenting tool. The first claw 3 is hinged at 19 to a frame member 2a. The claw 3 has a rear portion 20 which normally is urged against a stop edge 22 by a leg spring 21 held in place by a stud 3a secured to the frame member 2a. The edge 22 is also secured to the frame member 2a. The claw 3 has tips 3b with an outwardly curved surface which comes to bear against the surface of a nail board 23 when the robot arm 1 lowers the apparatus 1a into the position shown in FIG. 2.

The present apparatus also includes a second claw 4 at the end of an elongated lever 4a arranged for cooperation with the tip 3b of the first claw 3. The lever 4a and thus the claw 4 are operated by a piston cylinder device 5a journalled to the edge 22 by journal studs 5. Thus, the piston cylinder device 5a for driving the claw 4 is tiltable about the journal studs 5. The elongated lever 4a is journalled approximately at its center to a linkage lever 6, the other end of which is journalled to the base plate by a journal bolt 7. The tilting range of the linkage lever 6 is limited downwardly by a lower stop 8 and upwardly by a further stop 9.

The upper end of the lever 4a has a ball socket 10 arranged for cooperation with a rod head 12 of the piston rod 11 of the piston cylinder device 5a. A tension spring 13 is connected between the lever 4a and the frame member 2a to constantly urge the ball socket 10 into cooperation with the rod head 12 of the piston rod 11 and so that the linkage lever 6 normally bears against the lower stop 8. Above the linkage lever 6 there is a further linkage lever 14, one end of which is pivoted to a fixed point 15 on the base plate 2, while the other free end of the linkage lever 14 is provided with a fork 16 arranged for cooperation with a stud 18 secured to the lever 4a between the ball socket 10 and the journal or pivot 4b. Thus, when the claw 4 tilts clockwise the stud 18 will be engaged in the fork 16, please see FIGS. 3 and 4.

As shown, the robot arm 1 holds the bundle presenting apparatus 1a just sufficiently above the surface of the nail board 23 so that the claw tip 3b can contact that surface. The board 23 carries a plurality of nails 24 forming a conventional mounting harness for the conductors 25 to form a bundle to be bound into a cable tree. In the shown rest position the claw tip 3b just bearly touches the surface of the nail board 23. In order to grip the bundle 25 the robot arm lowers the apparatus 1a a just sufficiently by a determined stroke so that the claw 3 will turn counterclockwise and the end portion 20 will be lifted off the stop edge 22 against the force of the spring 21.

Figure 2:
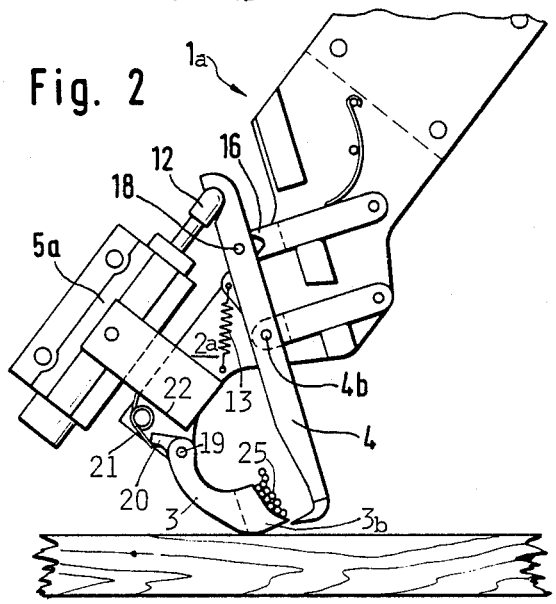
FIG. 2 is a view similar to that of FIG. 1, but showing the two jaws in an almost closed position, whereby one of the jaws has already partially lifted the bundle.

FIG. 2 shows the apparatus 1a in the starting phase of the gripping operation. In this position the piston cylinder device 5a is operated to close the claw 4, whereby the piston rod 11 with its head 12 imparts a clockwise movement to the lever 4a about its journal axis 4b until the stud 18 engages in the fork 16.

In FIG. 3 the piston rod 11 has brought the claw 4 into the closing position. If the piston rod 11 is further moved to turn the lever 4a in the clockwise direction, the parallelogram guide 40 formed by the levers 6 and 14 causes the lever 4a and thus the claw 4 to be lifted into the position shown in FIG. 4 in which the lever 6 bears against the stop 9. This guiding of the movement of the claw 4 is assured because the stud 18 is held in the fork 16 and the elements 4b, 7, 15, and 18 form the pivot points of the above mentioned parallelogram guide. Thus, the lifting movement of the claw 4 is actually a coupling movement.

In the position shown in FIG. 4, the bundle is lifted off the nail board 23 and ready for the binding operation by the tool 1b which may be activated by the robot in accordance with a suitable program.

In order to lift the conductor bundle 25 only a few simple partial movement steps are required and these steps can be accomplished by simple controls. The starting position is achieved by the movement of the robot arm to the desired position above the bundle 25. The gripping position is achieved by lowering the robot arm. The closing and lifting is achieved by operating the piston cylinder device 5a, whereby the lifting phase follows consequently on the closing phase due to the disclosed kinematic arrangement of the parallel guide 40.

In order to assure a positive gripping and lifting of the bundle 25, the tip 3b of the spring biased claw 3 is also fork shaped. The fork shape provides a groove between the two tips into which the claw 4 may dip. Instead of using a piston cylinder drive 5a, other drives may be employed for moving the claw 4, for example, by an electromotor.

Figure 5:
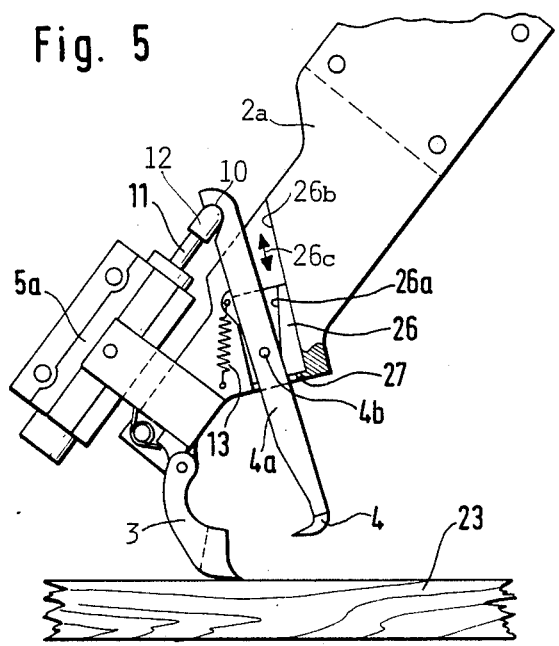
FIG. 5 is a view similar to that of FIG. 1, but showing a modified guide mechanism for one of the claws.

FIG. 5 shows a modified embodiment of the invention in which the claw 4 with the lever 4a is mounted for journalling in a slide member 26 supporting the journal 4b of the lever 4a. The slide member 26 is guided in a guide groove 26b for an approximately vertical up and down movement as indicated by the arrow 26c. A lower stop 27 limits the downward movement of the slide member 26. In the illustrated open rest position of the claw 4 the spring 13 urges the lever 4a in the counterclockwise direction, whereby the rod head 12 of the piston rod 11 engages he ball socket 10 as in the other embodiments. The slide member 26 has a stop surface 26a forming a ramp against which the edge of the lever 4a rests when the claw 4 has reached the closing position. Thereafter, the lifting movement is caused by the further extension of the piston rod 11, whereby the entire slide member 26 slides upwardly in its guide groove 26b. Here again, a parallel displacement of the lever 4a is assured by the arrangement of the cooperating elements.

Figure 6:
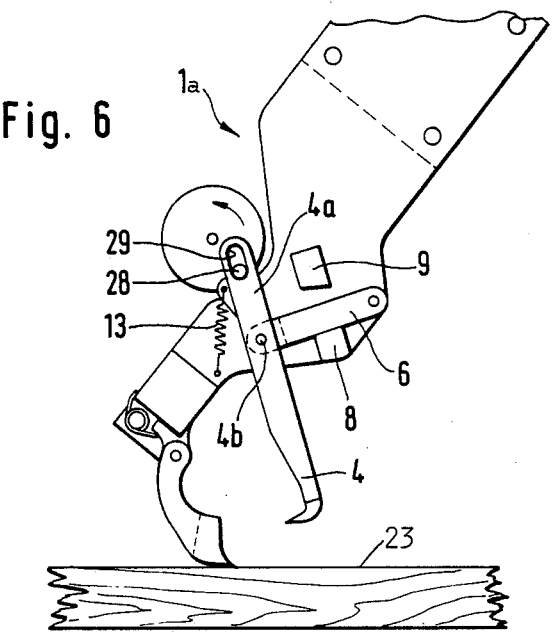
FIG. 6 shows a view similar to that of FIG. 1 of a further modification in which one of the claws is driven b a crank.

FIG. 6 illustrates another embodiment of the bundle presenting apparatus 1a according to the invention, wherein the claw 4 is operated by a motor drive crank member 28 effective in an elongated hole 29 at the upper end of the lever 4a. The rest position of the claw 4 is again determined when the lever 6 rests against the lower stop 8. The spring 13 makes sure that the closing movement is a pure tilting movement when the crank member 28 rotates so that the claw 4 tilts about the journal 4b until the crank member 28 reaches the end of the elongated hole 29. At that point the lifting movement begins until the lever 6 rests against the upper stop 9. Any time the lever 6 reaches an end position as determined by the stops 8 and 9, the crank drive is switched off through respective stop switches not shown.

Referring again to FIG. 3, a leaf spring 17 constantly urges the lever 14 against the stop 9. This feature makes sure that the stud 18 will always find the fork 16 of the lever 14, so that the lifting movement of the lever 4a may follow the rotational movement.

Incidentally, both claws have curved bundle facing surfaces which facilitate the lifting of the bundle off the nail board surface.

Although the invention has been described with reference to specific example embodiments, it will be appreciated, that it is intended to cover all modifications and equivalents within the scope of the appended claims.

What I claim is:

1. An apparatus for lifting a bundle of conductors off a surface and presenting the bundle to means for applying a cable binder to said lifted bundle of conductors, comprising a robot arm, a program controllable bundle lifting tool means supported by said robot arm for lifting and presenting said lifted bundle to a bundle binding tool for a binding operation, said apparatus further comprising frame means for attachment to said robot arm, said bundle lifting tool means comprising a first claw journalled to said frame means in an initial position for tilting in response to contacting a firm surface, first spring means for biasing said first claw into said initial position, a second claw, means for mounting said second claw on said frame means for a first rotational claw closing movement relative to said first claw and for a second linear bundle lifting movement following said claw closing movement, and power drive means arranged for operating said second claw to sequentially perform said first and second movements for lifting said bundle off said firm surface and presenting said bundle to said bundle binding tool.

2. The apparatus of claim 1, wherein said second claw comprises an elongated lever with a claw member at a lower lever end, said mounting means for said second claw comprising movable journal means (4b) permitting a tilting and a lifting movement of said elongated lever, said power drive means comprising piston cylinder means having a piston rod with a free end engaging an upper end of said elongated lever for causing said first and second movements.

3. The apparatus of claim 2, wherein said piston rod has a spherical rod head, said elongated lever having a ball socket for engaging said rod head, and spring means (13) arranged for urging said ball socket into engagement with said rod head.

4. The apparatus of claim 2, wherein said movable journal means comprises a first linkage lever (6), first pivot means (4b) rotatably securing said elongated lever (4a) to one end of said first linkage lever, second pivot means (7) securing the other end of said first linkage lever (6) to said frame means, a second linkage lever (14) having a fork (16) at one end, third pivot means (15) rotatably securing said second linkage lever (14) to said frame means, said elongated lever having a stud (18) located for engaging said fork (16) at an end of said first rotational movement, said first, second, and third pivot means (4b, 7, 15) and said stud (18) being so located as to form a guide parallelogram for the second linear movement.

5. The apparatus of claim 1, wherein said mounting means comprise a guide groove in said frame means, a slide member (26) in said guide groove, and journal means (4b) rotatably mounting said second claw in said slide member, said guide groove guiding said slide member in said second linear movement approximately perpendicularly to a horizontal surface such as a nail board.

6. The apparatus of claim 1, wherein said power drive means comprise a motor driven crank drive, said second claw comprising an elongated lever having an elongated hole (29) at its end opposite said claw, said crank drive having a crank pin engaging said elongated hole for performing said first and second movements sequentially.

7. The apparatus of claim 1, wherein said first claw has a bundle facing curved surface which helps a bundle to ride up on said bundle facing curved surface.

* * * * *